United States Patent
Jibowu et al.

(10) Patent No.: US 10,565,655 B2
(45) Date of Patent: Feb. 18, 2020

(54) SYSTEMS AND METHODS FOR PROVIDING CUSTOMIZED FINANCIAL ADVICE

(71) Applicant: CAPITAL ONE SERVICES, LLC, McLean, VA (US)

(72) Inventors: Rashan Jibowu, Hoboken, NJ (US); Brian Farris, New York, NY (US); Neeraj Gaur, Jersey City, NJ (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 15/665,997

(22) Filed: Aug. 1, 2017

(65) Prior Publication Data

US 2018/0336636 A1 Nov. 22, 2018

Related U.S. Application Data

(60) Provisional application No. 62/506,860, filed on May 16, 2017.

(51) Int. Cl.
G06Q 40/00 (2012.01)
G06Q 40/06 (2012.01)
G06Q 10/04 (2012.01)

(52) U.S. Cl.
CPC ............ *G06Q 40/06* (2013.01); *G06Q 10/04* (2013.01)

(58) Field of Classification Search
None
See application file for complete search history.

(56) References Cited

U.S. PATENT DOCUMENTS

| 9,858,584 | B2 * | 1/2018 | Jain | G06Q 30/0201 |
| 2002/0091635 | A1 * | 7/2002 | Dilip | G06Q 20/10 |
| | | | | 705/39 |
| 2015/0141043 | A1 * | 5/2015 | Abramson | G01C 21/34 |
| | | | | 455/456.1 |
| 2016/0055514 | A1 * | 2/2016 | Loomis | G06Q 30/0226 |
| | | | | 705/14.33 |

OTHER PUBLICATIONS

Wanare et al., "Human Emotion Recognition From Speech" Int. Journal of Engineering Research and Applications, ISSN: 2248-9622, vol. 4, Issue 7 (Version 4), Jul. 2014, pp. 74-78.*

* cited by examiner

*Primary Examiner* — Olabode Akintola
(74) *Attorney, Agent, or Firm* — Troutman Sanders LLP; Christopher J. Forstner; John A. Morrissett

(57) ABSTRACT

A system includes one or more memory devices storing instructions, and one or more processors configured to execute the instructions to perform steps of a method for providing customized financial advice. The system may receive transaction data for a transaction associated with a customer and satisfaction data associated with the transaction. Based on the received transaction data and satisfaction data, the system may update a financial state of the customer and a financial policy for determining one or more actions to take in order to maximize a cumulative reward associated with the customer. The system may determine and output a recommended action based on the updated financial policy and customer financial state.

18 Claims, 3 Drawing Sheets

SYSTEMS AND METHODS FOR PROVIDING CUSTOMIZED FINANCIAL ADVICE

CROSS-REFERENCE TO RELATED APPLICATION

This application claims the benefit of U.S. Provisional Application No. 62/506,860, filed 16 May 2017, the entire contents and substance of which is hereby incorporated by reference.

FIELD OF INVENTION

The present disclosure relates to systems and methods for providing customized financial advice, and more particularly providing systems and methods for determining improved financial behavior for a particular customer based on the observed satisfaction associated with a plurality of transactions.

BACKGROUND

When making financial decisions, such as transferring money to a savings account, making an investment, paying off credit card debt, or purchasing an item or service, customers generally want to maximize the value they receive from the transactions they engage in. To improve financial decision-making and help align short-term financial habits with long-term financial goals, customers often engage the services of financial planners, investment advisors, or other such service providers. While financial advice from such service providers can be helpful, it can be limited by being insufficiently tailored to an individual customer and corresponding to a particular time frame. For example, financial advice for many customers, particularly those who cannot afford or choose not to pay for individualized advice, is often generalized based on a rule of thumb (e.g., advising a customer to save at least 10% of his or her paycheck without considering the customer's financial profile). As a result, such generic advice may be more applicable to some customers than others, and may even be disadvantageous to certain customers.

Even when the financial advice is directed to a group of customers having financial situations that appear similar, differing values and financial priorities of those customers may necessitate different advice for each. For example, a first person may highly value financial security and thus may hold preparing for retirement as their top priority, whereas a second person may highly value the experience of traveling while they are young and thus may value spending money today more highly than saving money for tomorrow.

Further, individualized financial advice may still be limited even when it is not cost prohibitive. For example, while a financial advisor may attempt to obtain a more personalized understanding of a customer's financial state and their goals, their advice may still be limited because it is based on a high level snapshot of the customer's finances and stated goals and values. In viewing a high level snapshot of a customer's finances, information may be lost that may otherwise be captured by analyzing individual transactions as well as transactions that occur after the snapshot is taken. Further, a customer's verbalization of their values may not be accurate when viewed in comparison to the customer's actual behavior. Accordingly, generating financial advice based on a high level snapshot of a customer's financial state paired with their expressed goals and values may produce advice that is not truly tailored to that customer's situation and values at that point in time or in the future. Further, producing generic advice in association with a high level financial snapshot may provide little benefit in aiding a customer in making day-to-day financial decisions.

Accordingly, there is a need for improved systems and methods to provide customized financial advice based on transaction-level data that provides indications of the value received by the individual in relation to each transaction. Embodiments of the present disclosure are directed to this and other considerations.

SUMMARY

Disclosed embodiments provide systems and methods for providing customized financial advice.

Consistent with the disclosed embodiments, the system may include one or more memory devices storing instructions, and one or more processors configured to execute the instructions to perform steps of a method of providing customized financial advice. The system may execute the instructions to receive environmental data representative of an environment comprising a plurality of financial states that include a first financial state and a second financial state. The first financial state may initially correspond with a customer financial state associated with a customer. The system may receive financial policy data representing a financial policy for determining one or more actions from a plurality of actions to take in order to maximize a cumulative reward associated with a customer, where each of the plurality of actions is associated with one or more financial decisions. The system may then receive first transaction data and first satisfaction data for a first transaction associated with the customer. Based on the first transaction data, the system may update the customer financial state to correspond with the second financial state of the plurality of financial states. Based on the first transaction data and the first satisfaction data, the system may update the financial policy. The system may then determine a recommended action out of the plurality of actions based on the updated financial policy and the updated customer financial state and output recommendation data for display by a user device associated with the customer.

Consistent with the disclosed embodiments, methods for providing customized financial advice are also disclosed.

Further features of the disclosed design, and the advantages offered thereby, are explained in greater detail hereinafter with reference to specific embodiments illustrated in the accompanying drawings, wherein like elements are indicated be like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

DETAILED DESCRIPTION

Figure 1:
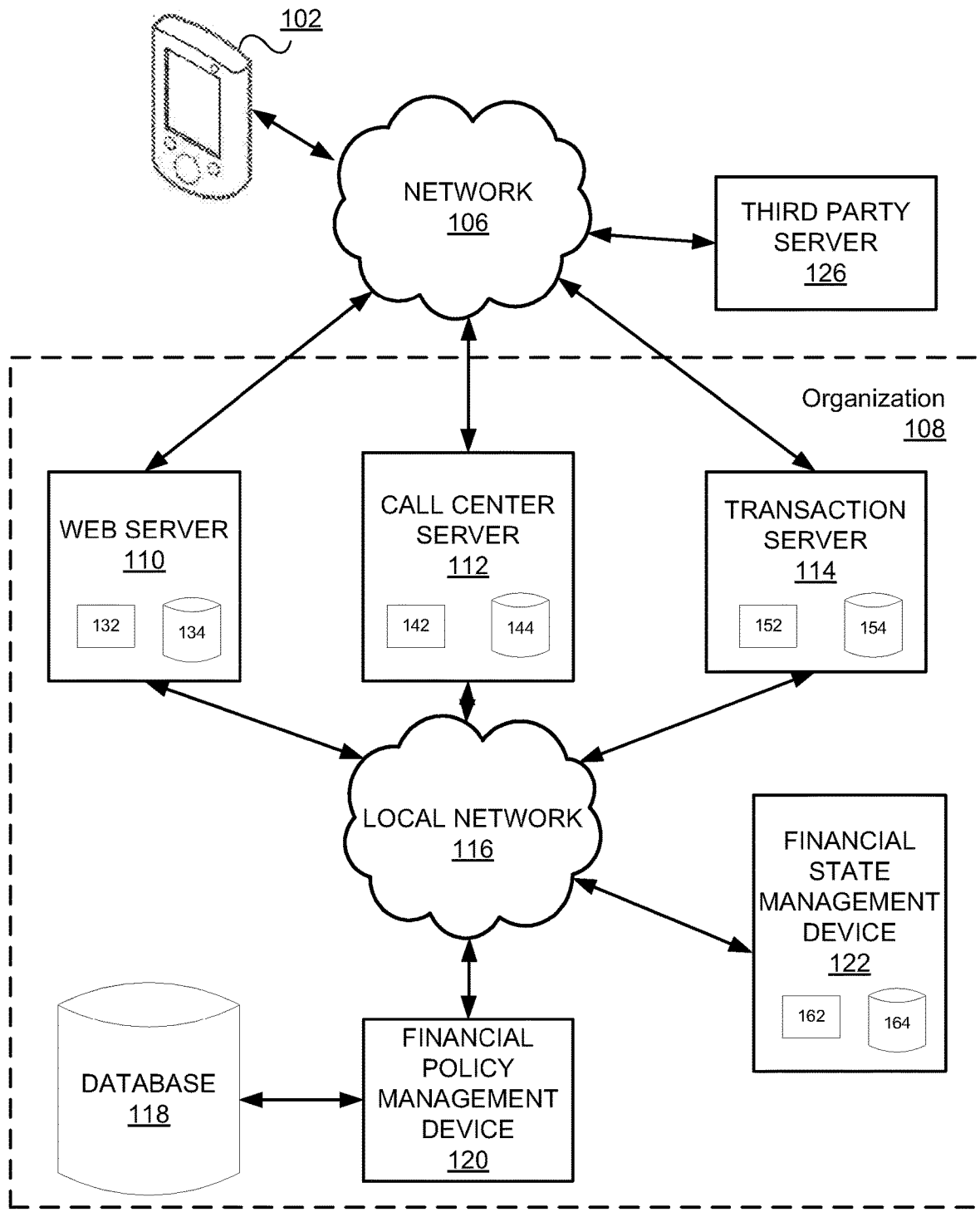
FIG. 1 is a diagram of an exemplary system that may be used to provide customized financial advice.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

The disclosed embodiments are directed to systems and methods for providing customized financial advice. The system may include one or more memory devices storing instructions, and one or more processors configured to execute the instructions to perform steps of a method. Specifically, in some embodiments, the system may execute the instructions to receive environmental data representative of an environment comprising a plurality of financial states that include a first financial state and a second financial state. The first financial state may initially correspond with a customer financial state associated with a customer. The system may receive financial policy data representing a financial policy for determining one or more actions from a plurality of actions to take in order to maximize a cumulative reward associated with a customer, where each of the plurality of actions is associated with one or more financial decisions. The system may then receive first transaction data and first satisfaction data for a first transaction associated with the customer. Based on the first transaction data, the system may update the customer financial state to correspond with the second financial state of the plurality of financial states. Based on the first transaction data and the first satisfaction data, the system may update the financial policy. The system may then determine a recommended action out of the plurality of actions based on the updated financial policy and the updated customer financial state and output recommendation data for display by a user device associated with the customer.

In another embodiment, a method for providing customized financial advice is disclosed. The method may include receiving environmental data representative of an environment comprising a plurality of financial states that include a first financial state and a second financial state. The first financial state may initially correspond with a customer financial state associated with a customer. The method may further include receiving financial policy data representing a financial policy for determining one or more actions from a plurality of actions to take in order to maximize a cumulative reward associated with a customer, where each of the plurality of actions being associated with one or more financial decisions. The method may further include receiving first transaction data and first satisfaction data for a first transaction associated with the customer. The method may include updating the customer financial state to correspond with the second financial state based on the first transaction data. The may further include updating the financial policy based on the first transaction data and the first satisfaction data. The method may include determining a recommended action out of the plurality of actions based on the updated financial policy and the updated customer financial state and outputting recommendation data for display by a user device associated with the customer.

In another embodiment a non-transitory computer-readable medium storing instructions that, when executed by one or more processors, cause a system to receive environmental data representative of an environment comprising a plurality of financial states comprising a first financial state and a second financial state, is disclosed. The first financial state may initially correspond with a customer financial state associated with a customer. The system may receive financial policy data representing a financial policy for determining one or more actions from a plurality of actions to take in order to maximize a cumulative reward associated with a customer, where each of the plurality of actions is associated with one or more financial decisions. The system may then receive first transaction data and first satisfaction data for a first transaction associated with the customer. Based on the first transaction data, the system may update the customer financial state to correspond with the second financial state of the plurality of financial states. Based on the first transaction data and the first satisfaction data, the system may update the financial policy. The system may then determine a recommended action out of the plurality of actions based on the updated financial policy and the updated customer financial state and output recommendation data for display by a user device associated with the customer.

Although the above embodiments are described with respect to systems, it is contemplated that embodiments with identical or substantially similar features may alternatively be implemented as methods and/or non-transitory computer-readable media.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

FIG. 1 is a diagram of an exemplary system 100 that may be configured to perform one or more processes that may provide customized financial advice. The components and arrangements shown in FIG. 1 are not intended to limit the disclosed embodiments as the components used to implement the disclosed processes and features may vary. As shown, system 100 may include a user device 102, a network 106, and an organization 108 including, for example, a web server 110, a call center server 112, a transaction server 114, a local network 116, a database 118, a financial policy management (FPM) device 120, and a financial state management (FSM) device 122.

In some embodiments, a customer may operate user device 102. User device 102 can include one or more of a mobile device, smart phone, general purpose computer, tablet computer, laptop computer, telephone, PSTN landline, smart wearable device, voice command device, other mobile computing device, or any other device capable of communicating with network 106 and ultimately communicating with one or more components of organization 108. In some embodiments, a user device may include or incorporate electronic communication devices for hearing or vision impaired users. User device 102 may belong to or be provided by a customer, or may be borrowed, rented, or shared. Customers may include individuals such as, for example, subscribers, clients, prospective clients, or customers of an entity associated with organization 108, such as individuals who have obtained, will obtain, or may obtain a product, service, or consultation from an entity associated with organization 108. According to some embodiments, user device 102 may include an environmental sensor for obtaining audio or visual data, such as a microphone and/or digital camera, a geographic location sensor for determining the location of the device, an input/output device such as a transceiver for sending and receiving data, a display for displaying digital images, one or more processors including a sentiment depiction processor, and a memory in communication with the one or more processors.

Network 106 may be of any suitable type, including individual connections via the internet such as cellular or WiFi networks. In some embodiments, network 106 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Network 106 may comprise any type of computer networking arrangement used to exchange data. For example, network 106 may be the Internet, a private data network, virtual private network using a public network, and/or other suitable connection(s) that enables components in system environment 100 to send and receive information between the components of system 100. Network 106 may also include a public switched telephone network ("PSTN") and/or a wireless network.

Organization 108 may be associated with an entity such as a business, corporation, individual, partnership, or any other entity that provides one or more of goods, services, and consultations to individuals such as customers.

Organization 108 may include one or more servers, devices, and computer systems for performing one or more functions associated with products and/or services that organization 108 provides. Such servers, devices, and computer systems may include, for example, web server 110, call center server 112, transaction server 114, FPM device 120, and FSM device 122, as well as any other computer systems necessary to accomplish tasks associated with organization 108 or the needs of customers (which may be customers of the entity associated with organization 108).

Web server 110 may include a computer system configured to generate and provide one or more websites accessible to customers, as well as any other individuals involved in organization 108's normal operations. Web server 110 may include a computer system configured to receive communications from a user device 102 via for example, a mobile application, a chat program, an instant messaging program, a voice-to-text program, an SMS message, email, or any other type or format of written or electronic communication. Web server 110 may have one or more processors 132 and one or more web server databases 134, which may be any suitable repository of website data. Information stored in web server 110 may be accessed (e.g., retrieved, updated, and added to) via local network 116 and/or network 106 by one or more devices (e.g., FPM device 120) of system 100. According to some embodiments, web server 110 may receive satisfaction data such as, for example, surveys or reviews filled out on websites, responses to customer service representatives or chatbots in web-enabled chat applications, or user inputs received via a mobile application on a user device 102.

Call center server 112 may include a computer system configured to receive, process, and route telephone calls and other electronic communications with a customer operating user device 102. Call center server 112 may have one or more processors 142 and one or more call center databases 144, which may be any suitable repository of call center data. Information stored in call center server 112 may be accessed (e.g., retrieved, updated, and added to) via local network 116 and/or network 106 by one or more devices (e.g., FPM device 120) of system 100. In some embodiments, call center server processor 142 may be used to implement an interactive voice response (IVR) system that interacts with the customer over the phone. In some embodiments, call center server may receive satisfaction data such as recorded responses to survey questions asked over the phone and voice recordings that may be used to determine the emotional state of a customer by analyzing aspects of the recording, such as the customer's tone, pitch, rate of speech, etc.

Transaction server 114 may include a computer system configured to process one or more transactions involving an account associated with a customer, or a request received from customers. In some embodiments, transactions can include, for example, a product/service purchase, product/service return, financial transfer, financial deposit, financial withdrawal, financial credit, financial debit, dispute request, warranty coverage request, and any other type of transaction associated with the products and/or services that an entity associated with organization 108 provides to individuals such as customers. Transaction server 114 may have one or more processors 152 and one or more transaction server databases 154, which may be any suitable repository of transaction data. Information stored in transaction server 114 may be accessed (e.g., retrieved, updated, and added to) via local network 116 and/or network 106 by one or more devices (e.g., FPM device 120) of system 100.

In some embodiments, transaction server 114 tracks and stores event data regarding interactions between a third party, such as third party server 126, with organization 108, on behalf of the individual. For example, transaction server 114 may track third party interactions such as purchase requests, refund requests, warranty claims, account withdrawals and deposits, and any other type of interaction that third party server 126 may conduct with organization 108 on behalf of an individual such as customer.

Local network 116 may comprise any type of computer networking arrangement used to exchange data in a localized area, such as WiFi, Bluetooth™ Ethernet, and other suitable network connections that enable components of organization 108 to interact with one another and to connect to network 106 for interacting with components in system environment 100. In some embodiments, local network 116 may comprise an interface for communicating with or linking to network 106. In other embodiments, components of organization 208 may communicate via network 106, without a separate local network 116.

According to some embodiments, database 118 may be a database associated with organization 108 and/or its related entity that may store a variety of information relating to customers, transactions, satisfaction data, financial state data, financial policy data, and business operations. Database 118 may also serve as a back-up storage device and may contain data and information that is also stored on, for example, local databases associated with web server 110, call center server 112, transaction server 114, FPM device 120, and FSM device 122. Database 118 may be accessed by other devices (e.g., FPM device 120) and may be used to store records of every interaction, communication, and/or transaction a particular customer has had with organization 108 and/or its related entity.

FPM device 120 may include a computer system configured to store, execute, and update financial policy data that represents a financial policy. According to some embodiments, a financial policy may be a set of rules that may be applied to select or determine an action from a plurality of actions in order to maximize a cumulative reward associated with a customer. According to some embodiments, the financial policy may apply rules to a set of actions to determine an estimated reward associated with each action, and then may prioritize the recommendation of each action based on the expected reward in order to maximize the reward. For example, a customer may have the option to buy a cheeseburger or a slice of pizza for lunch, and the policy may determine that the expected reward for the customer is higher if the customer buys the cheeseburger, and therefore may recommend buying the cheeseburger over the pizza.

According to some embodiments, the FPM device 120 may revise the financial policy over time using reinforcement learning techniques. In some embodiments, such reinforcement learning techniques may include, but are not limited to, Q-learning, policy gradients, and actor-critic methods. According to some embodiments, the financial policy may iteratively analyze transaction data associated with a plurality of transactions in combination with satisfaction data associated with the plurality of transactions to learn which types of transactions yield the greatest benefit for the customer over time. According to some embodiments, the financial policy may also take into account the financial state of the customer over time. In some embodiments, the rules of the financial policy and expected reward of a particular action may change based on the current financial state of the customer. For example, a cheeseburger may cost a dollar less than a pizza, but a customer may enjoy eating pizza more than a cheeseburger, presenting conflicting interests. However, based on the customer's financial state the financial policy may estimate a different reward for each purchase in each scenario such that, for example, if the customer only has $100 in their savings account, the customer my derive more value from saving the dollar from buying the cheeseburger than from the increased value the customer receives from enjoying the pizza more than the cheeseburger and thus the expected reward associated with buying the cheeseburger may be higher than the expected reward associated with buying the pizza in this case. However, if the customer has $100,000 in savings, the incremental value gained from saving a dollar may be less than the value the customer derives from the enjoyment of eating the pizza, and thus the expected reward associated with buying the pizza may be higher than buying the cheeseburger. Thus, according to some embodiments, based on a customer's individual values, goals, and financial circumstances, FPM device 120 may help the customer maximize the outcomes of daily financial decisions by maintaining an ever-evolving financial policy that can yield recommendations to the customer about what financial action to take next. In some embodiments, FPM device 120 can determine an optimal path to determine what specific actions (e.g., financial decisions) a customer should take to achieve a particular goal by setting a financial policy to maximize the intended goal (e.g., to maximize savings over a period of time) and train a reinforcement learning algorithm to optimize a set of choices and behaviors that have been observed by the system through past transactions and other data to yield the optimal set of actions that a customer should take to real the specified goal.

Although the previous example compares a financial gain to enjoyment of a food item, it should be understood that a customer's satisfaction with or value derived from a transaction can be gauged or estimated using a variety of different quantitative and qualitative measures such as, for example but not limited to, improvements to financial situation (e.g., increased savings, increased cash flow, decreased debt, decreased expenses, improved credit scores, and any associated/resulting increases in financial capability etc.), enjoyment of an experience, impact on health, increase in knowledge and learning, increase in capabilities, increase in happiness, or increase in the happiness of others. According to some embodiments, customer satisfaction related to a customer's financial situation may be measured using dollars (or any other currency), customer satisfaction related to a customer's health may be quantified by measures of the customer's weight, strength, speed, stamina, and the like, and measures of a customer's satisfaction related to enjoyment may be quantified using a rating generated by the customer.

As described above, according to some embodiments, FPS device 120 may update the financial policy in response to receiving satisfaction data associated with a transaction in order to determine the level of reward the customer received from a particular transaction. Satisfaction data may be collected in various forms, such as but not limited to, written or oral survey responses, costumer ratings or reviews of products or services via a mobile application or website, comments made on social media associated with a transaction or product, and emotional states recognized by analysis of a customer's facial expression, body language, voice/audio analysis, or satisfaction inferred from the retention or increased usage of a product or service. In some embodiments, FPS device 120 may receive satisfaction data from another device, such as for example, user device 102, web server 110, call center server 112, transaction server 114, and third party server 126. For example, FPS device 120 may receive satisfaction data from a call center server 112 that represents audio data obtained from a recorded phone call with a customer in relation to a transaction, where the audio data may be analyzed to determine a user's satisfaction with the transaction by analyzing aspects of the customer's speech (such as tone, pitch, speed, etc.). In some embodiments, web server 110 or third party server 126 may have customer data such as social media content including written statements, photos, and videos of a customer that may be analyzed to determine the customer's satisfaction with a transaction. For example, a customer may post a video on a social media site making statements about how much the customer enjoyed going to a particular event or how disappointed the customer was in a particular restaurant. FPS device 120 may collect this sentiment data and use it to determine an estimation of the reward obtained by a customer in association with a particular transaction. Although the previous description relates to collecting sentiment data associated with the customer making the purchasing decision, it should be understood that sentiment data may also be collected from others associated with the customer. For example, if a parent purchases dinner for the entire family, FPS device 120 may collect sentiment data associated with all of the family members under the presumption that the parent will be happier if their family is happy. In some embodiments, the FPS device 120 may collect sentiment data from a recipient of a gift purchased by a customer so that over time the policy may learn what gifts are more likely to please general or particular recipients in order to maximize the customer's spending on gifts.

FSM device 122 may include a computer system configured to store, manage, and update environmental data representative of an environment comprising a plurality of financial states. According to some embodiments, a financial state may represent a set of circumstances, parameters, and/or attributes associated with a particular individual or entity. For example, a financial state may represent a snapshot of a particular customer's financial status and may include, for example but not limited to, account balances, assets, loans and other forms of credit, savings goals, age, income, zip code, credit score, cash flow, expenses, or any other data, or changes thereof, that may provide an insight into the customer's financial situation. According to some embodiments, financial state may also include a variety of other types of information that may be considered in providing financial advice that is specific to a particular individual, such as, for example, the customer's education, health, housing, or location. In some embodiments, the environment may be considered to be a plurality of possible financial states. According to some embodiments, the environment may include an unlimited or infinite number of possible financial states, based on the number of parameters used to constitute a financial state. In some embodiments, FSM device 122 may store and update the environment by, for example, updating the plurality of possible financial states with changes in information. For example, if interest rates change, FSM device 122 may update the applicable interest rates in the pertinent financial states of the plurality of financial states.

According to some embodiments, FSM device 122 may manage and update the current financial state associated with one or more customers. For example, a particular customer may begin with a first financial state that includes, for example, initial bank account and credit card balances, assets, loans, financial goals, and the like. According to some embodiments, FSM device 122 may update the financial state of the customer from the first financial state to a second financial state in response to receiving transaction data for a transaction associated with the customer. For example, if the customer purchases a certificate of deposit (CD), FSM device 122 may update the customer financial state to reflect a reduction in the savings account of the customer and the addition of, for example, a 5 year CD that yields 4% interest. According to some embodiments, FSM device 122 may receive transaction data from web server 110, call center server 112, transaction server 114, or third party server 126. For example, if a customer calls into call center server 112 and makes a credit card payment over the phone, call center server 112 may transmit the details of that transaction to FSM device 122. In some embodiments, FSM device 122 may be enabled to access various customer accounts that are associated with organization 108 and an associated entity that may have data stored in, for example database 118. In some embodiments, FSM device 122 may store login in credentials such as usernames, account numbers, and passwords to access a customer's account information for accounts that are not associated with organization 108 but may otherwise be accessed on a remote server via network 106. According to some embodiments, FSM device 122 may continuously or intermittently access one or more customer accounts in order to determine if any update to the customer's financial state may be required.

Although the preceding description describes various functions of web server 110, call center server 112, transaction server 114, database 118, FPM device 120, and FSM device 122, in some embodiments, some or all of these functions may be carried out by a single computing device.

For ease of discussion, embodiments may be described in connection with the provision of customized financial advice to a customer. It is to be understood, however, that disclosed embodiments are not limited to providing customized advice to individuals, but may also be applied to providing customized financial advice to businesses and other organizations. Further, steps or processes disclosed herein are not limited to being performed in the order described, but may be performed in any order, and some steps may be omitted, consistent with the disclosed embodiments.

The features and other aspects and principles of the disclosed embodiments may be implemented in various environments. Such environments and related applications may be specifically constructed for performing the various processes and operations of the disclosed embodiments or they may include a general purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low level software instructions, such as machine code (e.g., such as that produced by a compiler) and/or high level code that can be executed by a processor using an interpreter.

Figure 2:
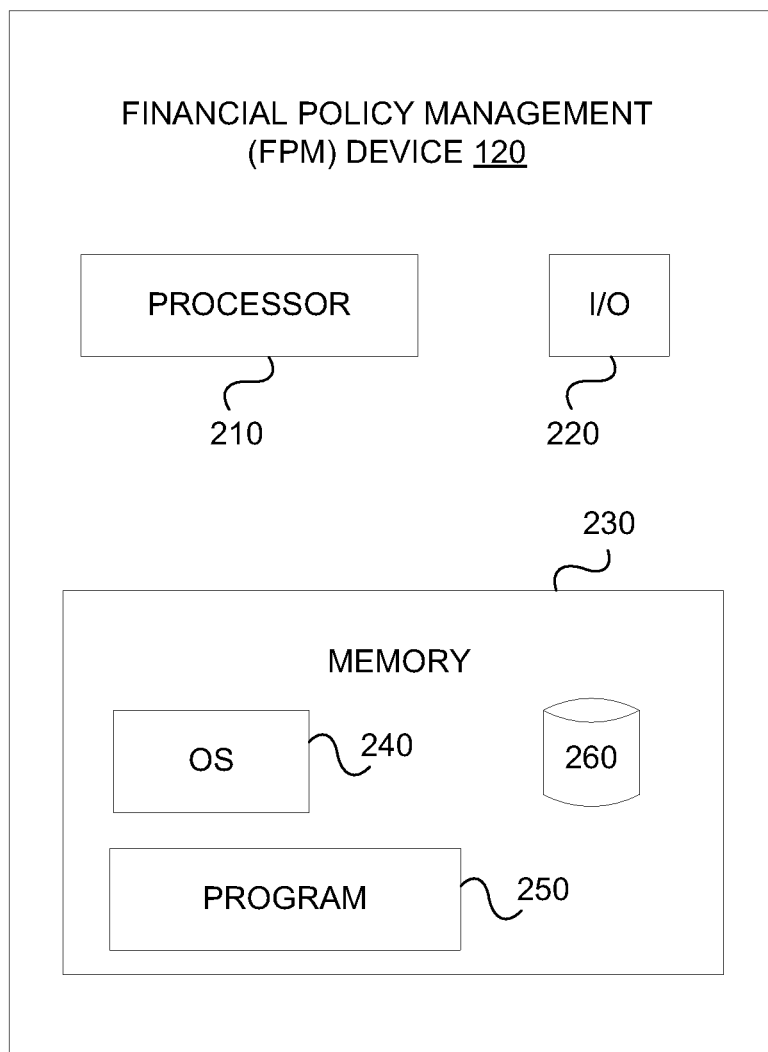
FIG. 2 is a component diagram of an exemplary financial policy management device.

An exemplary embodiment of FPM device 120 is shown in more detail in FIG. 2. Web server 110, call center server 112, transaction server 114, FSM device 122, third party server 126 and/or user device 102 may have a similar structure and may include many components that are similar to or even have the same capabilities as those described with respect to FPM device 120. As shown, FPM device 120 may include a processor 210, an input/output ("I/O") device 220, a memory 230 containing an operating system ("OS") 240 and a program 250. For example, FPM device 120 may be a single device or server or may be configured as a distributed computer system including multiple servers, devices, or computers that interoperate to perform one or more of the processes and functionalities associated with the disclosed embodiments. In some embodiments, FPM device 120 may further include a peripheral interface, a transceiver, a mobile network interface in communication with the processor 210, a bus configured to facilitate communication between the various components of the prouder device 110, and a power source configured to power one or more components of the web server 110.

A peripheral interface may include hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, a local area network, or another wide-area network. In some embodiments, a mobile network interface may include hardware, firmware, and/or software that allows the processor(s) 210 to communicate with other devices via wired or wireless networks, whether local or wide area, private or public, as known in the art. A power source may be configured to provide an appropriate alternating current (AC) or direct current (DC) to power components.

Processor 210 may include one or more of a microprocessor, microcontroller, digital signal processor, co-processor or the like or combinations thereof capable of executing stored instructions and operating upon stored data. Memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory 230.

Processor 210 may be one or more known processing devices, such as a microprocessor from the Pentium™ family manufactured by Intel™ or the Turion™ family manufactured by AMD™. Processor 210 may constitute a single core or multiple core processor that executes parallel processes simultaneously. For example, processor 210 may be a single core processor that is configured with virtual processing technologies. In certain embodiments, processor 210 may use logical processors to simultaneously execute and control multiple processes. Processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

FPM device 120 may include one or more storage devices configured to store information used by processor 210 (or other components) to perform certain functions related to the disclosed embodiments. In some embodiments, FPM device 120 may include memory 230 that includes instructions to enable processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, FPM device 120 may include memory 230 that includes instructions that, when executed by processor 210, perform one or more processes consistent with the functionalities disclosed herein. Methods, systems, and articles of manufacture consistent with disclosed embodiments are not limited to separate programs or computers configured to perform dedicated tasks. For example, FPM device 120 may include memory 230 that may include one or more programs 250 to perform one or more functions of the disclosed embodiments. Moreover, processor 210 may execute one or more programs 250 located remotely from system 100. For example, system 100 may access one or more remote programs 250, that, when executed, perform functions related to disclosed embodiments. In some embodiments, FPM device 120 may include a financial policy program 250 that is a rules-based program for estimating the reward received from various actions and outputting recommendations for maximizing a customer's financial decisions as described below.

Memory 230 may include one or more memory devices that store data and instructions used to perform one or more features of the disclosed embodiments. Memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. Memory 230 may include software components that, when executed by processor 210, perform one or more processes consistent with the disclosed embodiments. In some embodiments, memory 230 may include a database 260 for storing related data to enable FPM device 120 to perform one or more of the processes and functionalities associated with the disclosed embodiments.

FPM device 120 may also be communicatively connected to one or more memory devices (e.g., databases) locally or through a network. The remote memory devices may be configured to store information and may be accessed and/or managed by FPM device 120. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

FPM device 120 may also include one or more I/O devices 220 that may comprise one or more interfaces for receiving signals or input from devices and providing signals or output to one or more devices that allow data to be received and/or transmitted by web server 110. For example, web server 110 may include interface components, which may provide interfaces to one or more input devices, such as one or more keyboards, mouse devices, touch screens, track pads, trackballs, scroll wheels, digital cameras, microphones, sensors, and the like, that enable web server 110 to receive data from one or more users (such as, for example, via user device 102).

In exemplary embodiments of the disclosed technology, FPM device 120 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While web server 110, call center server 112, transaction server 114, FPM device 120, and FSM device 122 have been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the web server 110, call center server 112, transaction server 114, FPM device 120, and FSM device 122 may include a greater or lesser number of components than those illustrated.

Figure 3:
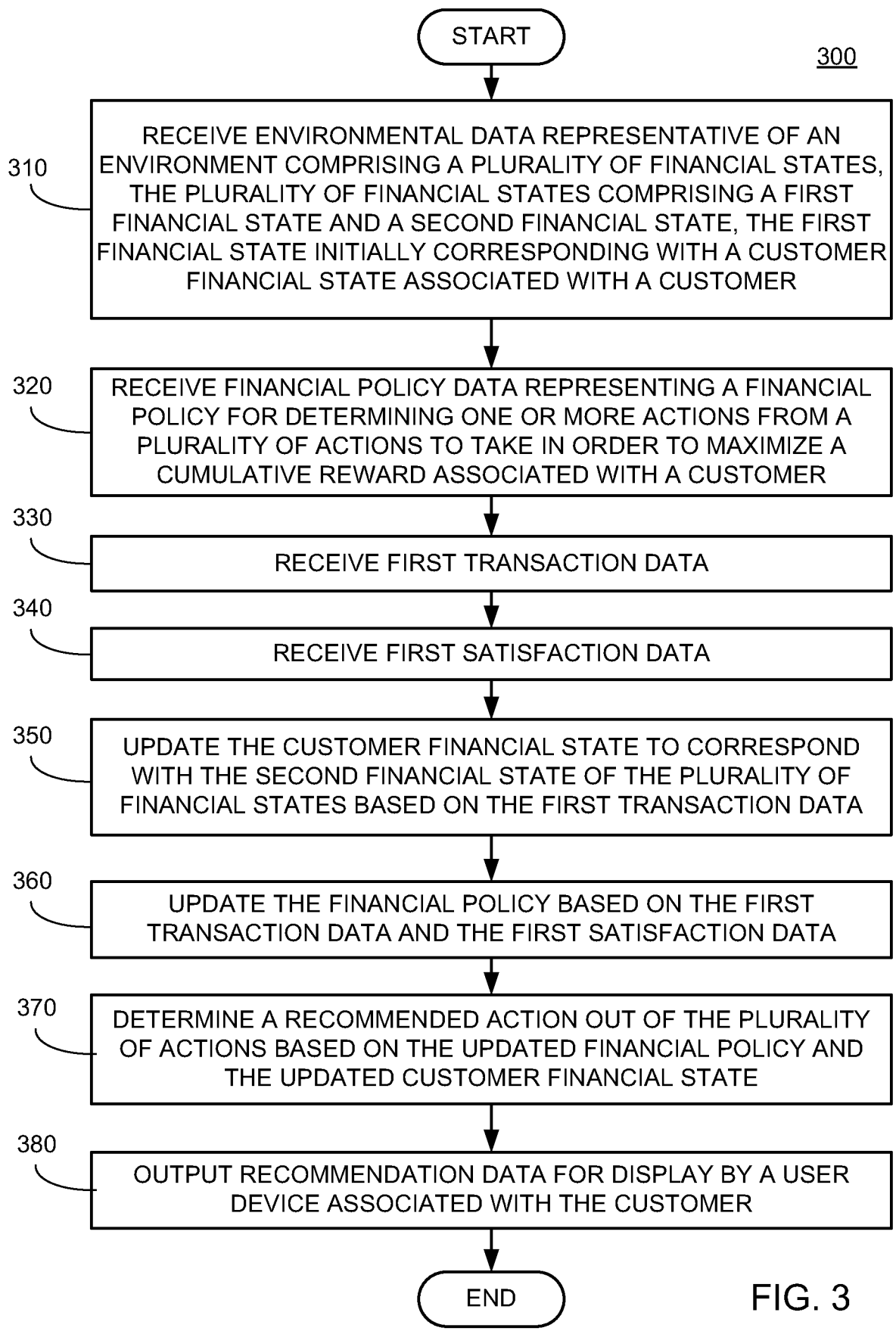
FIG. 3 is a flowchart of an exemplary system for providing customized financial advice.

FIG. 3 shows a flowchart of a method 300 for providing customized financial advice. Method 300 may be performed by some or all of web server 110, call center server 112, transaction server 114, database 118, FPM device 120, and FSM device 122.

In block 310, the system may receive (e.g., at FSM device 122) environmental data representative of an environment comprising a plurality of financial states. According to some embodiments, the plurality of financial states may comprise at least a first financial state and a second financial state, and the first financial state may initially correspond with a customer financial state associated with a customer. Accordingly, in some embodiments, the first financial state may represent a current snapshot of the customer's financial circumstances that may include for example, account balances, assets, loans and other forms of credit, savings goals, age, income, zip code, credit score, cash flow, expenses, or any other data, or changes thereof, that may provide an insight into the customer's financial situation. In some embodiments that second financial state may represent a potential future customer financial state that represents the customer's financial circumstances following the execution of a particular transaction or action taken by the customer.

In block 320, the system may receive (e.g., at FPM device 120) financial policy data representing a financial policy. According to some embodiments, a financial policy may be used to determine one or more actions from a plurality of actions to take in order to maximize a cumulative reward associated with a customer. In some embodiments, each of the plurality of actions may be associated with one or more financial decisions. For example, a first action may be to buy a cheeseburger, a second action may be to buy a pizza, and a third action may be to buy a salad. According to some embodiments, FPM device 120 may estimate an expected reward with each action based on the financial policy, which may include a set of rules to calculate the expected reward for each action. In some embodiments, a reward may be represented as a number, such that for example, the FPM device 120 may determine that buying a cheeseburger has an expected reward of zero, buying a pizza has an expected reward of two, and buying a salad has an expected reward of negative one. According to some embodiments, because the financial policy is designed to maximize the reward, in the previous example the financial policy would prioritize buying the pizza over the cheeseburger, and would prioritize buying the salad last. The FPM device 120 may determine the expected reward for each action based on the financial policy rules, which may have been developed over time by observing the satisfaction the customer has received in the past from a plurality of previous transactions.

In block 330, the system may receive (e.g., at FSM device 122) first transaction data for a first transaction associated with the customer. For example, if the customer purchases a cheeseburger, FSM device 122 may receive transaction data that may include, for example, the price of the item, the location of the purchase, the time and day of the purchase, the account or credit card used to make the purchase, any discounts or coupons used in association with the purchase, and any other such data that may be associated with the transaction. Transaction data may be received from, for example, transaction server 114, third party server 126, or user device 102.

In block 340, the system may receive (e.g., at FPM device 120) satisfaction data for the first transaction. For example, FPM device 120 may receive a review or survey response associated with the purchase of the cheeseburger submitted to web server 110 or orally to call center server 112, a rating of the cheeseburger input by a user via a mobile application on a user device 102, the magnitude of a tip left in association with the purchase of the cheeseburger from transaction server 114, or a comment on social media stored on a third party server 126 that indicates a level of satisfaction with the purchased cheeseburger. As described above, satisfaction data received by FPM device 120 in association with a transaction may provide an indication of the value, happiness, or enjoyment a customer derived from a particular transaction or from a plurality of transactions. For example, a measure of happiness can be derived from whether a customer increases usage of a good or service by examining the customer's transactions.

In block 350, the system (e.g., via FSM device 122) may update the customer financial state to correspond with the second financial state of the plurality of financial states based on the first transaction data. For example, if the initial customer financial state indicated that the customer had $100 in their bank account and the customer executed a transaction involving the expense of $5 on a cheeseburger, FSM device 122 may update the customer financial state to correspond to the second financial state, which is a financial state in which the customer has $95 in their bank account and a cheeseburger.

In block 360, the system (e.g., via FPM device 120) may update the financial policy based on the first transaction data and the first satisfaction data. For example, after receiving satisfaction data indicating that the customer enjoyed the cheeseburger, the FPM device 120 may determine that in this instance there was a positive reward associated with the purchase of the cheeseburger and may therefore adjust the financial policy to favor the purchase of cheeseburgers (vs. other options) in the future. The FPM device 120 may determine the magnitude of the reward obtained from the transaction by, for example, using an adaptive function. Accordingly, in some embodiments, the FPM device 120 may update the financial policy by determining a reward associated with a transaction based on the satisfaction data and determining whether the reward increases or decreases the cumulative reward associated with the customer. The FPM device may determine the reward associated with the transaction by applying a set of rules associated with the financial policy to the updated financial state and the satisfaction data associated with the transaction. In some embodiments, a cumulative reward may represent one or more of a savings goal, a passive income goal, a debt reduction goal, or a happiness goal. In some embodiments, a cumulative reward may represent the expected sum of all future rewards, which may include all types of rewards. Accordingly, in some embodiments, measures of different reward types (e.g., financial rewards vs. health rewards) may be translated to a common set of units so that they may be summed. In block 370, the system (e.g., via FPM device 120) may determine a recommended action out of the plurality of actions based on the updated financial policy and the updated customer financial state. In some embodiments, the FPM device 120 may determine a recommended action in response to a prompt from, for example, user device 102. For example, a user may use a mobile application on user device 102 to generate a query to FPM device 120 to ask, for example, "what should I buy for lunch today?" In some embodiments, FPM device 120 may automatically generate a recommendation based on, for example, the location of the customer, the date, the time of date, device type, past behavior, location of the transaction, anticipated rewards, or other factors that may define the customer financial state.

In block 380, the system (e.g., via FPM device 120) may output recommendation data based on the recommended action for display by a user device 102 associated with the customer. For example, FPM device 120 may generate a notification to user device 102 to present the recommended action to the user. In some embodiments, outputting the recommendation may be an optional step, as the FPM device 120 may continually update, test, and refine the financial policy before outputting a recommendation to for display to a user. In some embodiments, FPM device 120 may determine that refraining from outputting a recommendation may lead to the greatest future cumulative reward and may therefore refrain from outputting a recommendation until that determination changes. According to some embodiments, FPM device 120 may output recommendations in accordance with a predetermined schedule. For example, FPM device 120 may output recommendations once a week while continuing to refine the financial policy for the remainder of the week. In some embodiments, FPM device 120 may output a recommendation if it determines that the confidence level of the recommendation exceeds a predetermined threshold. In some embodiments, FPM device 120 may refrain from outputting a recommendation if there is no recommendation to output or if the recommendation is to take no action.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Exemplary Use Cases

The following exemplary use cases describe examples of a typical user flow pattern. They are intended solely for explanatory purposes and not in limitation. A customer is typically confronted with multiple financial decisions on a daily basis, running the gamut from investment decisions, decisions about spending money on clothes, entertainment, or gifts for others, or simply a decision about what to buy for lunch. The customer may have certain individualized values (e.g., they really enjoy pizza above all other food) and individualized goals (e.g., they want to retire, or be financially positioned to retire, at 60). The system may help the customer maximize the outcomes of these daily financial decisions, such as, for example, a decision about what to buy for lunch, by maintaining (e.g., via FPM device 120) an ever-evolving financial policy that can yield recommendations to the customer about what financial action to take next based on what is currently known about the customer's values, current financial state, and future goals. The system works by observing the transactions (e.g., via transaction server 114) made by the customer over time and attempting to estimate (e.g., via FPM device 120) the value received by the customer in relation to each transaction by observing (e.g., via web server 110) an indication of how satisfied the customer is with the transaction. For example, the customer might eat at a particular restaurant and might respond to a survey indicating that they really enjoyed the meal. The system (e.g., via web server 110) may obtain survey results that indicate the customer was highly satisfied with the transaction. The system (e.g., via FPM device 120) may then revise the financial policy to create a preference for the restaurant in the future based on the high satisfaction that the customer experienced from it. The system (e.g., via FPM device 120) may iteratively revise the financial policy in this way with every transaction made by the customer, gradually learning which actions yield better results for the customer. The system may also track (e.g., via FSM device 122) the customer's changing financial state over time, in relation to the satisfaction derived from various transactions, as the customer continues to engage in financial transactions. For example, in a relatively poor state, the customer may derive a high satisfaction out of purchasing fast food because it is inexpensive, but upon entering a wealthy state the customer may derive little or no satisfaction from fast food but instead may derive satisfaction from, for example, fresh produce to meet health-focused goals, despite the fresh produce being more expensive than the fast food. As the system learns about the customer's values and tracks the customer's financial state, the system (e.g., via FPM device 120) can generate recommendations designed to maximize the customer's value. For example, the customer may be deciding what to buy for lunch, and the system (e.g., via FPM device 120) may output a recommendation that the customer purchase a particular item on the lunch menu from a particular restaurant.

Another exemplary use case would be if a customer is making a purchase, such as a gift, on behalf of someone else.

In this case, the system (e.g., via transaction server 126) may receive data associated with the transaction, but may also receive (e.g., via web server 110) satisfaction data associated with the recipient of the purchase. For example, a customer may buy a video game for a friend, and the system (e.g., via web server 110) may obtain a customer review from the friend indicating that the friend had a high level of satisfaction with the game. Because this represents a successful gift purchase, the customer has accomplished their goal of providing a good gift. The system (e.g., via FPM device 120) may incorporate this satisfaction data into the financial policy, which may then provide future recommendations about what gifts to buy in the future. Similarly, the system (e.g., via web server 110) may obtain a customer review from the friend relating to a previously purchased game for the friend, which may have been purchased by the customer, the friend, or a third party, and incorporate (e.g., via FPM device 120) this old customer review into the financial policy to provide the current recommendation of which game to buy.

Another exemplary use case would be use by an investment advisor to manage a customer's investment portfolio. In this case, the system may attempt to maximize the rewards (e.g., the balances of the various investment accounts of the customer), subject to any constraints that have been specified by the customer. For example, a customer may indicate a desire to not have more than a certain percentage of their holdings in the stock market at any one time. In some cases, such constraints may be computed by the system based on what the system knows about the customer's profile and preferences. The system would then actively manage the investments to maximize the rewards. The system (e.g., FPM device 120) would take actions not only based on the customer's preferences and financial situation, but also based on what the system learns about the financial environment, which may dynamically change. For example, the system (e.g., FPM device 120) may learn about the financial environment based on the rewards that have been gained from past actions for other users and the system may pool that information together to provide individualized recommendations based on a particular customer's financial state.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

The invention claimed is:

1. A system for providing customized financial advice, the system comprising:
   one or more processors; and
   a memory in communication with the one or more processors and storing instructions that, when executed by the one or more processors, are configured to cause the system to:
   continuously access one or more customer accounts to obtain, via a network, environmental data representative of an environment comprising a plurality of financial states, the plurality of financial states comprising a first financial state and a second financial state, the first financial state initially corresponding with a customer financial state associated with a customer and the one or more customer accounts associated with the customer;
   receive, via the network, financial policy data representing a financial policy for determining, by a machine learning system, one or more actions from a plurality of actions to take in order to maximize a cumulative reward associated with a customer, each of the plurality of actions being associated with one or more financial decisions;
   receive, via the network, first transaction data for a first transaction associated with the customer;
   implement an interactive voice response (IVR) system to produce a first interaction with the customer via the network, the first interaction including receiving first audio data indicative of a first spoken satisfaction communication from the customer, the first spoken satisfaction communication indicative of a first satisfaction of the customer regarding the first transaction;
   analyze the first audio data to determine a first tone, a first pitch, and a first rate of speech associated with the first audio data;
   perform a first comparison comprising comparing the first tone to known tone data, the first pitch to known pitch data, and the first rate of speech to known rate of speech data;

determine first satisfaction data based on the first comparison;

update, based on the first transaction data, the customer financial state to correspond with the second financial state of the plurality of financial states;

update, by the machine learning system and using one or more reinforcement learning techniques, the financial policy based on the first transaction data;

receive, via the network, second transaction data for a second transaction associated with the customer, the second transaction being associated with a purchase, investment, or other transaction different from a purchase, investment, or other transaction associated with the first transaction data;

implement the IVR system to produce a second interaction with the customer via the network, the second interaction including receiving second audio data indicative of a second spoken satisfaction communication from the customer, the second spoken satisfaction communication indicative of a second satisfaction of the customer regarding the second transaction;

analyze the second audio data to determine a second tone, a second pitch, and a second rate of speech associated with the second audio data;

perform a second comparison comprising comparing the second tone to the known tone data, the second pitch to the known pitch data, and the second rate of speech to the known rate of speech data;

determine second satisfaction data based on the second comparison;

update, based on the second transaction data, the customer financial state to correspond with a third financial state of the plurality of financial states;

update, by the machine learning system and using the one or more reinforcement learning techniques, the financial policy based on the second transaction data and the second satisfaction data;

update a relative customer satisfaction policy based on the first satisfaction data and the second satisfaction data; and responsive to receiving, via the network and from a customer device associated with the customer, a query for a recommended action:
automatically determine the recommended action out of the plurality of actions based on the updated financial policy, the updated relative customer satisfaction policy, and the updated customer financial state; and
output, to the customer device and via the network, recommendation data for display by the customer device, the recommendation data being indicative of the recommended action.

2. The system of claim 1, wherein the first satisfaction data is associated with a recipient of a good or service purchased by the customer.

3. The system of claim 1, wherein updating the relative customer satisfaction policy comprises:
determining a first reward based on the first satisfaction data; and
determining whether the first reward increases or decreases the cumulative reward associated with the customer, the cumulative reward representing one or more of a savings goals, a passive income goal, a debt reduction goal, and a happiness goal.

4. The system of claim 3, wherein determining the first reward comprises applying a set of rules associated with the financial policy to the second financial state and the first satisfaction data.

5. The system of claim 1, wherein the instructions, when executed by the one or more processors, are configured to further cause the system to:
receive third transaction data for a third transaction associated with the customer, the third transaction being associated with a purchase, investment, or other transaction the same as or similar to the purchase, investment, or other transaction associated with the first transaction data;
receive, via an electronic interface, third satisfaction data for the third transaction, the electronic interface being between the customer and the system for providing customized financial advice and the third satisfaction data being derived from a detection of a facial expression or body language from a third image;
update, based on the third transaction data, the customer financial state to correspond with a fourth financial state of the plurality of financial states;
update the financial policy based on the third transaction data; and
update the relative customer satisfaction policy based on the third satisfaction data.

6. The system of claim 1, wherein the first satisfaction data is derived from a detection of a facial expression or body language from a first image associated with the first transaction and the second satisfaction data is derived from a detection of a facial expression or body language from a second image associated with the second transaction.

7. The system of claim 1, wherein the one or more reinforcement learning techniques includes at least one of Q-learning, a policy gradient method, and an actor-critic method.

8. A method of providing customized financial advice comprising:
continuously accessing one or more customer accounts to obtain, via a network, environmental data representative of an environment comprising a plurality of financial states, the plurality of financial states comprising a first financial state and a second financial state, the first financial state initially corresponding with a customer financial state associated with a customer and the one or more customer accounts associated with the customer;
receiving, via the network, financial policy data representing a financial policy for determining, by a machine learning system, one or more actions from a plurality of actions to take in order to maximize a cumulative reward associated with a customer, each of the plurality of actions being associated with one or more financial decisions;
receiving, via the network, first transaction data for a first transaction associated with the customer;
implementing an interactive voice response (IVR) system to produce a first interaction with the customer via the network, the first interaction including receiving first audio data indicative of a first spoken satisfaction communication from the customer, the first spoken satisfaction communication indicative of a first satisfaction of the customer regarding the first transaction;
analyzing the first audio data to determine a first tone, a first pitch, and a first rate of speech associated with the first audio data;

performing a first comparison comprising comparing the first tone to known tone data, the first pitch to known pitch data, and the first rate of speech to known rate of speech data;
determining first satisfaction data based on the first comparison;
updating, based on the first transaction data, the customer financial state to correspond with the second financial state of the plurality of financial states;
updating, by the machine learning system and using one or more reinforcement learning techniques, the financial policy based on the first transaction data;
receiving, via the network, second transaction data for a second transaction associated with the customer, the second transaction being associated with a purchase, investment, or other financial transaction different from a purchase, investment, or other transaction associated with the first transaction data;
implement the IVR system to produce a second interaction with the customer via the network, the second interaction including receiving second audio data indicative of a second spoken satisfaction communication from the customer, the second spoken satisfaction communication indicative of a second satisfaction of the customer regarding the second transaction;
analyzing the second audio data to determine a second tone, a second pitch, and a second rate of speech associated with the second audio data;
perform a second comparison comprising comparing the second tone to the known tone data, the second pitch to the known pitch data, and the second rate of speech to the known rate of speech data;
determining second satisfaction data based on the second comparison;
updating, based on the second transaction data, the customer financial state to correspond with a third financial state of the plurality of financial states;
updating, by the machine learning system and using the one or more reinforcement learning techniques, the financial policy based on the second transaction data and the second satisfaction data;
updating a relative customer satisfaction policy based on the first satisfaction data and the second satisfaction data; and
responsive to receiving, via the network and from a customer device associated with the customer, a query for a recommended action:
automatically determining the recommended action out of the plurality of actions based on the updated financial policy, the updated relative customer satisfaction policy, and the updated customer financial state; and
outputting, to the customer device and via the network, recommendation data for display by the customer device, the recommendation data being indicative of the recommended action.

9. The method of claim 8, wherein the first satisfaction data is associated with a recipient of a good or service purchased by the customer.

10. The method of claim 8, wherein updating the relative customer satisfaction policy comprises:
determining a first reward based on the first satisfaction data; and
determining whether the first reward increases or decreases the cumulative reward associated with the customer.

11. The method of claim 8 further comprising:
receiving third transaction data for a third transaction associated with the customer, the third transaction being associated with a purchase, investment, or other transaction the same as or similar to the purchase, investment, or other transaction associated with the first transaction data;
receiving, via an electronic interface, third satisfaction data for the third transaction, the electronic interface being between the customer and the system for providing customized financial advice and the third satisfaction data being derived from a detection of a facial expression or body language from a third image;
updating, based on the third transaction data, the customer financial state to correspond with a fourth financial state of the plurality of financial states;
updating the financial policy based on the third transaction data; and
updating the relative customer satisfaction policy based on the third satisfaction data.

12. The method of claim 8, wherein the first satisfaction data is derived from a detection of a facial expression or body language from a first image associated with the first transaction and the second satisfaction data is derived from a detection of a facial expression or body language from a second image associated with the second transaction.

13. The method of claim 8, wherein the one or more reinforcement learning techniques includes at least one of Q-learning, a policy gradient method, and an actor-critic method.

14. The machine learning system of claim 13, wherein the one or more reinforcement learning techniques includes at least one of Q-learning, a policy gradient method, and an actor-critic method.

15. A machine learning system for providing customized financial advice, the machine learning system comprising:
one or more processors; and
a memory in communication with the one or more processors and storing instructions that, when executed by the one or more processors, are configured to cause the machine learning system to:
continuously update, by the machine learning system, customer policy data representing a customer policy specific to a customer, the machine learning system being configured to optimize the customer policy to maximize a cumulative reward associated with the customer and for a given transaction, a cumulative award being associated with an expected total benefit to the customer, the expected total benefit being based on an expected financial benefit for the customer and an expected satisfaction benefit for the customer and being associated with a future action;
responsive to receiving, by the machine learning system and via a network and from a customer device associated with the customer, a query for a recommended action:
automatically determine, by the machine learning system and based on the updated customer policy and a current financial state of the customer, a recommended action out of a plurality of actions, the recommended action corresponding to the maximized cumulative award at the current financial state of the customer; and
output, to the customer device and via the network, recommendation data for display by the customer device, the recommendation data being indicative of the recommended action, wherein the machine learning system is configured to:
continuously access, by a machine learning system and via a network, one or more customer accounts to obtain environmental data representative of an environment comprising a plurality of financial states such that the machine learning system can determine the current financial state of the customer;
implement an interactive voice response (IVR) system to produce an interaction with the customer via the network;
receive, for each of a plurality of transactions and from the customer device via the IVR system, a satisfaction input indicative of a satisfaction of the customer regarding the transaction, the satisfaction input being audio data indicative of a spoken satisfaction communication from the customer communicating the satisfaction of the customer regarding a corresponding transaction;
analyze, for each satisfaction input, the satisfaction input to determine satisfaction data by:
analyzing the audio data to determine a tone, a pitch, and a rate of speech associated with the audio data;
performing a comparison comprising comparing the determined tone to known tone data, the determined pitch to known pitch data, and the determined rate of speech to known rate of speech data; and
determining the satisfaction data based on the tone, the pitch, and the rate of speech; and
continuously update, by the machine learning system, the customer policy based on the plurality of financial states and the satisfaction data.

16. The system of claim 15, wherein the satisfaction input is associated with a recipient of a good or service purchased by the customer.

17. The machine learning system of claim 15, wherein the memory stores additional instructions that, when executed by the one or more processors, cause the system to:
determine that the transaction benefits a third party, wherein the satisfaction data corresponds to the third party.

18. The machine learning system of claim 15, wherein the satisfaction data is derived from a detection of a facial expression or body language from an image associated with the transaction.

* * * * *